United States Patent Office 3,369,170
Patented Feb. 13, 1968

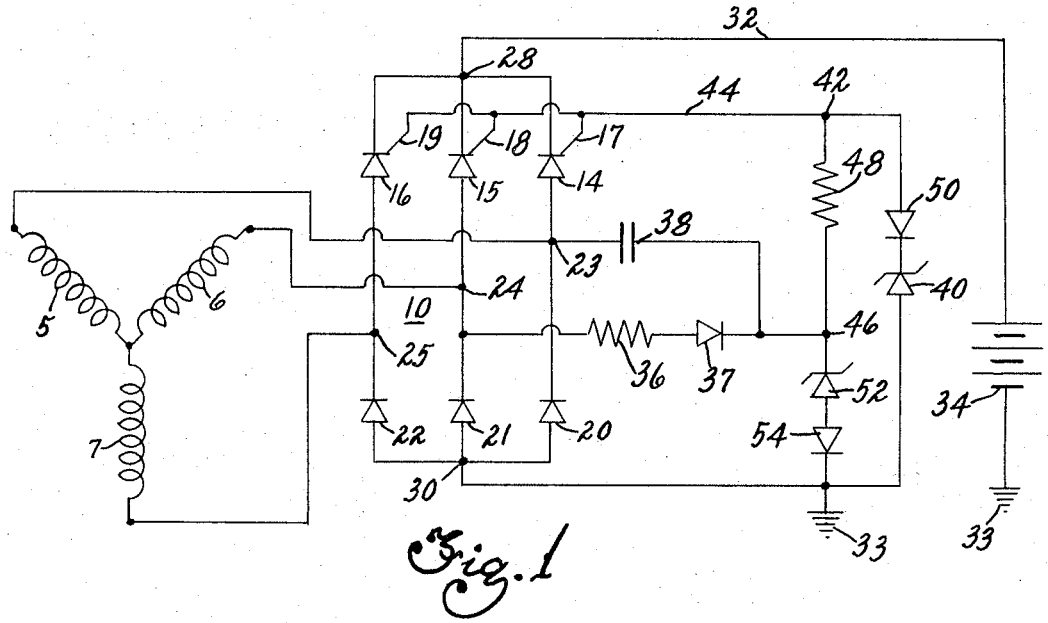
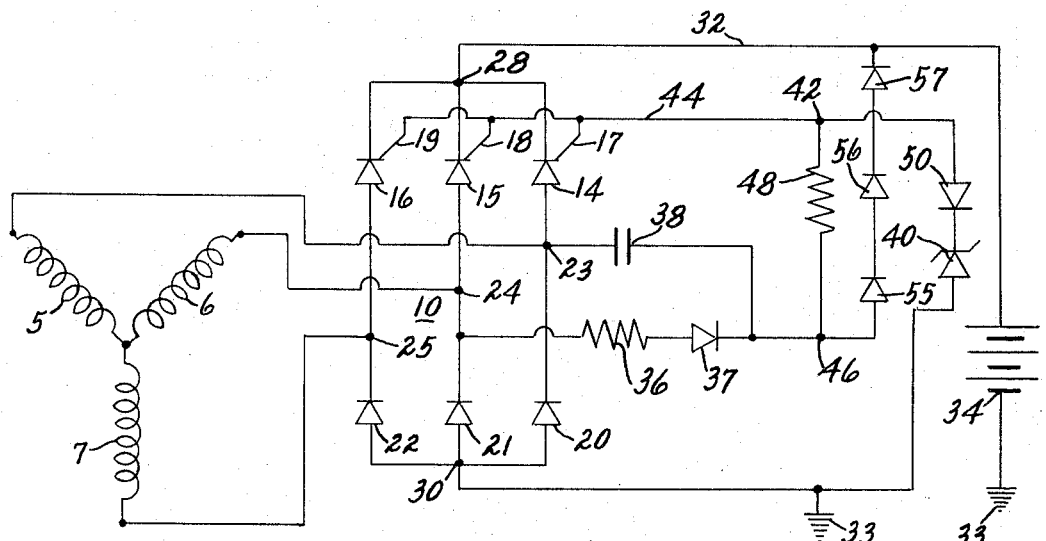
INVENTOR.
ROBERT E. CUSTER

3,369,170
POTENTIAL REGULATOR CIRCUIT FOR PERMANENT MAGNET TYPE ALTERNATORS
Robert E. Custer, Anderson, Ind., assignor to General Motors Corporation, Detroit, Mich., a corporation of Delaware
Filed July 19, 1965, Ser. No. 472,880
10 Claims. (Cl. 322—28)

ABSTRACT OF THE DISCLOSURE

A potential regulator circuit for permanent magnet type alternators wherein the associated rectifier circuit includes at least one silicon controlled rectifier. A control voltage is taken across one of the output windings of the alternator through the series combination of a capacitor, a diode and a resistor and is established at a value substantially equal to the desired regulator potential magnitude. This control voltage is applied to the control electrode of each of the silicon controlled rectifiers contained in the rectifier circuitry.

---

The present invention relates to a potential regulator circuit, and more specifically, to a potential regulator circuit for use with permanent magnet type alternators.

With dynamoelectric machines which depend upon current flowing through a field coil or winding for producing the necessary magnetic field, it is a common expedient to alter the amount of current flowing through the field coil in response to changes of output potential magnitudes for purposes of regulating the output potential of the machine. Permanent magnet type alternators, however, present a different regulating problem in that permanent magnet units provide the necessary magnetic field and, therefore, machines of this type are not adaptable to potential regulator circuits or arrangements which alter field coil current.

As alternators of the permanent magnet type offer certain advantages from the standpoint of cost and reliability over the field coil type, the requirement for a reliable and inexpensive potential regulator circuit or arrangement for dynamoelectric machines of the permanent magnet type is apparent.

It is, therefore, an object of this invention to provide an improved potential regulator circuit for use with permanent magnet type alternators.

It is another object of this invention to provide an improved potential regulator circuit for use with permanent magnet type alternators wherein one or more of the unidirectional current translating devices employed in the rectifier circuit is of the type which may be triggered to conduction upon the application to the control electrode thereof of a control potential signal of proper polarity.

In accordance with this invention a potential regulator circuit for use with permanent magnet type alternators is provided wherein a control potential signal circuit is connected across at least one of the output windings of the alternator for producing a control potential signal which may be applied to the control electrode of one or more unidirectional current translating devices, included in the rectifier circuitry, of the type which may be triggered to conduction upon the application of a control potential signal of proper polarity to the control electrode thereof when the rectified output potential is equal to or less than a predetermined maximum.

For a better understanding of the present invention together with additional objects, advantages and features thereof, reference is made to the following description and accompanying drawings in which:

FIGURE 1 schematically sets forth one embodiment of the regulator circuit of this invention, and FIGURE 2 schematically sets forth another embodiment of the regulator circuit of this invention.

In the two figures, like elements have been given like characters of reference.

For purposes of illustrating the features of the novel regulating arrangement of this invention and without intention or inference of a limitation thereto, the operation will be described in reference to a three phase permanent magnet type alternator. The output windings of a three phase permanent magnet type alternator are schematically illustrated in the figures as Y connected stator coils 5, 6 and 7. These coils may, of course, also be connected in a delta configuration. A magnetic field which is produced by a permanent magnet or magnets, not shown, moves relative to these coils and generates a three phase potential therein in a manner well known in the art. It is to be specifically understood that the novel circuit of this invention is also applicable with alternators having output windings upon the rotor. The regulating circuit arrangement of this invention regulates the rectified output potential of alternators of this type in a manner now to be explained.

To convert the three phase alternating current output potential generated in the stator coils 5, 6 and 7 to a rectified direct current output potential, a rectifier circuit, generally shown at 10, is provided. In the figures, rectifier circuit 10 is illustrated as a three phase bridge type rectifier circuit having three controllable unidirectional current translating devices, each having two current carrying electrodes and a control electrode and being of the type which may be triggered to conduction upon the application of a control potential signal of proper polarity to the control electrode thereof, in the positive polarity bank and three conventional unidirectional current translating devices in the negative polarity bank. Without intention or inference of a limitation thereto, the controllable unidirectional current translating devices have been herein shown as silicon controlled rectifiers 14, 15 and 16 having respective control electrodes 17, 18 and 19. These devices may be triggered to conduction with the application of a control potential signal to the control electrode which is more positive than the potential applied to the cathode electrode. The conventional unidirectional current translating devices have been illustrated as conventional diodes 20, 21 and 22. The free ends of stator coils 5, 6 and 7 are connected to respective junctions 23, 24 and 25 of rectifier circuit 10.

The rectifier output potential appears across positive polarity junction 28 and negative polarity junction 30 which may be terminals. With this configuration, line 32 is the positive polarity line. The negative polarity junction 30 may be connected to point of reference or ground potential 33 which, since it is the same point electrically, has been referenced by the same numeral throughout the drawings. The rectified output potential may be employed to charge a conventional storage battery 34 connected across positive polarity potential line 32 and point of reference or ground potential 33 and poled as shown.

A control potential signal circuit, comprising the series combination of resistor 36, diode 37 and capacitor 38, is connected across two stator coils 5 and 6 for producing the required control potential signal. While this control potential signal circuit is shown to be connected across stator coils 5 and 6 in the drawings, it may be connected across any selected coil pair or at least one stator coil of the alternator.

The maximum rectified output potential, as determined by the external electrical circuitry or devices with which the potential generating system is to be employed, is selected. To establish the control potential signal at a magnitude substantially equal to the selected maximum rectified output potential, a circuit element of the type characterized by a substantially constant potential drop thereacross with current flow therethrough is employed. This device is included to establish the control signal potential at a substantially constant magnitude. This device has been herein shown as a Zener diode 40 connected between junction 42 and point of reference or ground potential 33.

The control signal potential appears at junction 42 and is applied to the control electrodes 17, 18 and 19 of respective silicon controlled rectifiers 14, 15 and 16 through line 44.

The potential produced in stator coils 5 and 6 and rectified by diode 37 is of a positive polarity at junction 46 and charges capacitor 38 in such a manner that the plate of capacitor 38 connected to junction 46 is of a positive polarity relative to the other plate. Capacitor 38 tends to average the rectified potential at junction 46 and, therefore, tends to reduce the extremes of potential variations which may appear at junction 46 with variations of magnitude of the potential generated in stator windings 5 and 6. These variations of the rectified potential at junction 46 are further reduced by resistor 48, and, therefore, the control signal potential which is taken from junction 42 does not swing through the extreme variations of the potential generated in stator coils 5 and 6.

The cathode electrode of Zener diode 40 is connected to junction 42 through temperature compensating diode 50 and the anode electrode thereof is connected to point of reference or ground potential 33. Connected in this manner, Zener diode 40 is reverse biased and the potential drop thereacross remains substantially constant with changes in current flow therethrough. Therefore, Zener diode 40 compensates for any variations in magnitude of the control potential signal appearing at junction 42 and establishes this signal at a substantially constant value. For the proper operation of this unique circuit, the control potential signal appearing at junction 42 should be of a magnitude substantially equal to the selected maximum rectified output potential. Therefore, Zener diode 40 should be selected to have a reverse breakdown potential characteristic substantially equal to the selected maximum rectified output potential.

The electrical characteristics of silicon controlled rectifiers are similar to those of the well known gas filled electronic tubes. With a forward anode-cathode bias potential, these devices will conduct only upon the application to the control electrode of a control potential signal of a polarity more positive than the potential applied to the cathode electrode and, when triggered to conduction, will continue to conduct until the anode-cathode bias potentials are reversed or the circuit interrupted.

When the rectified output potential at junction 28 is of a magnitude less positive than the magnitude of the control potential signal at junction 42, silicon controlled rectifiers 14, 15 and 16 are triggered to conduction over the positive polarity excursions of the alternating current potential generated in the stator coils 5, 6 and 7 and, therefore, function as conventional diode rectifiers, a condition which tends to maintain the normal rectified output potential magnitude.

When the rectified output potential at junction 28 is of a magnitude more positive than the control potential signal at junction 42, applied to the respective control electrodes thereof, these devices are not triggered to conduction as the control potential present on the respective control electrodes is less positive than the potentials on the corresponding cathodes, and current flow is blocked between stator coils 5, 6 and 7 and positive polarity potential line 32, a condition which tends to reduce the magnitude of the rectified output potential.

When the magnitude of the rectified output potential reduces to a magnitude substantially equal to or less than the control potential signal appearing at junction 42, silicon controlled rectifiers 14, 15 and 16 are again triggered to conduction and bridge circuit 10 functions as a normal bridge rectifier circuit.

From this description, it is apparent that the novel circuit of this invention regulates the rectified output potential of an alternating curent generator by switching or not switching selected rectifier devices in the rectifier circuit to conduction in response to rectified output potential magnitudes.

When silicon controlled rectifiers 14, 15 and 16 are not triggered to conduction, high potential surges are generated in the stator coils and appear as rectified potential peaks at junction 46. These high potential peaks may be greatly attenuated or eliminated by clamping junction 46 to point of reference potential 33 as shown in FIGURE 1, or to the positive potential line 32 as is shown in FIGURE 2. In FIGURE 1, the cathode electrode of a Zener diode 52 is connected to junction 46 and the anode electrode thereof is connected to point of reference potential 33 through a conventional diode 54, which is inserted in series with Zener diode 52 to prevent current flow in the forward direction through Zener diode 52. Zener diode 52 is selected to have a reverse bias breakdown potential characteristic of a value slightly higher than that of Zener diode 40 so that the potential at junction 46 will go no higher than the potential as determined by this characteristic of Zener diode 52 and, therefore, will not follow the high potential surges which may appear in the stator coils when silicon controlled rectifiers 14, 15 and 16 are not conducting.

This same clamping effect may be produced by connecting junction 46 to the positive polarity line 32 through series connected conventional diodes 55, 56 and 57.

As alternating current potentials are produced in stator coils 5, 6 and 7, silicon controlled rectifiers 14, 15 and 16 are extinguished by the reverse anode-cathode bias potential applied thereacross with each negative excursion of the alternating current cycles.

This invention has been described in reference to the full wave rectification of a three phase alternating current generated potential. It is to be understood that this arrangement is equally applicable to full or half wave rectification of more or less alternating current phases and is not to be construed as limited to the specific embodiments of the figures. With half wave rectification, of course, fewer unidirectional current translating devices are required in the rectifier circuitry. The regulating arrangement of this invention may be employed in a half wave rectifier circuit employing only a single controllable unidirectional current translating device similar in characteristics to that of the silicon controlled rectifiers herein illustrated.

While a preferred embodiment of the present invention has been shown and described, it will be obvious to those skilled in the art that various modifications and substitutions may be made without departing from the spirit of the invention which is to be limited only within the scope of the appended claims.

What is claimed is as follows:

1. A potential regulating circuit for regulating the rectified output potential of a permanent magnet type alternator comprising a rectifier circuit including at least one controllable unidirectional current translating device having two current carrying electrodes and a control electrode and being of the type which may be triggered to conduction upon the application of a control potential signal of proper polarity to the control electrode thereof for rectifying the output potential generated in the output windings of said alternator, means for establishing a control potential signal of a magnitude substantially equal to the desired regulated potential magnitude and means for constantly applying said control potential signal to the said control electrode of said controllable unidirectional current translating device.

2. A potential regulating circuit for regulating the rectified output potential of a permanent magnet type alternator comprising a rectifier circuit including at least one silicon controlled rectifier having an anode, a cathode and a control electrode for rectifying the output potential generated in the output windings of said alternator, means for establishing a control potential signal of a magnitude substantially equal to the desired regulated potential magnitude and means for constantly applying said control potential signal to the said control electrode of said silicon controlled rectifier.

3. A potential regulating circuit for regulating the rectified output potential of a permanent magnet type alternator comprising a rectifier circuit including at least one unidirectional current translating device and at least one controllable unidirectional current translating device having two current carrying electrodes and a control electrode and being of the type which may be triggered to conduction upon the application of a control potential signal of proper polarity to the control electrode thereof for rectifying the output potential generated in the output windings of said alternator, means for establishing a control potential signal of a magnitude substantially equal to the desired regulated potential magnitude and means for constantly applying said control potential signal to the said control electrode of said controllable unidirectional current translating device.

4. A potential regulating circuit for regulating the rectified output potential of a permanent magnet type alternator comprising a rectifier circuit including at least one diode and at least one silicon controlled rectifier having an anode, a cathode and a control electrode for rectifying the output potential generated in the output windings of said alternator, means for establishing a control potential signal of a magnitude substantially equal to the desired regulated potential magnitude and means for constantly applying said control potential signal to the said control electrode of said silicon controlled rectifier.

5. A potential regulating circuit for regulating the rectified output potential of a permanent magnet type alternator comprising a full wave bridge type rectifier circuit including at least one unidirectional current translating device and at least one controllable unidirectional current translating device having two current carrying electrodes and a control electrode and being of the type which may be triggered to conduction upon the application of a control potential signal of proper polarity to the control electrode thereof for rectifying the output potential generated in the output windings of said alternator, means for establishing a control potential signal of a magnitude substantially equal to the desired regulated potential magnitude and means for constantly applying said control potential signal to the said control electrode of said controllable unidirectional current translating device.

6. A potential regulating circuit for regulating the rectified output potential of a permanent magnet type alternator comprising a full wave bridge type rectifier circuit including at least three unidirectional current translating devices and at least three controllable unidirectional current translating devices each having two current carrying electrodes and a control electrode and being of the type which may be triggered to conduction upon the application of a control potential signal of proper polarity to the control electrode thereof for rectifying the output potential generated in the output windings of said alternator, means for establishing a control potential signal of a magnitude substantially equal to the desired regulated potential magnitude and means for constantly applying said control potential signal to the said control electrode of each of said controllable unidirectional current translating devices.

7. A potential regulating circuit for regulating the rectified output potential of a permanent magnet type alternator comprising a rectifier circuit including at least one controllable unidirectional current translating device having two current carrying electrodes and a control electrode and being of the type which may be triggered to conduction upon the application of a control potential signal of proper polarity to the control electrode thereof for rectifying the output potential generated in the output windings of said alternator, a control potential signal circuit comprising the series combination of a resistor, a diode and a capacitor connected across at least one output winding of said permanent magnet type alternator for producing said control potential signal, means for establishing said control potential signal at a magnitude substantially equal to the desired regulated potential magnitude and means for applying said control potential signal to said control electrode of said controllable unidirectional current translating device.

8. A potential regulating circuit for regulating the rectified output potential of a permanent magnet type alternator comprising a rectifier circuit including at least one unidirectional current translating device and at least one controllable unidirectional current translating device having two current carrying electrodes and a control electrode and being of the type which may be triggered to conduction upon the application of a control potential signal of proper polarity to the control electrode thereof for rectifying the output potential generated in the output windings of said alternator, a control potential signal circuit comprising the series combination of a resistor, a diode and a capacitor connected across at least one output winding of said permanent magnet type alternator for producing said control potential signal, means for establishing said control potential signal at a magnitude substantially equal to the desired regulated potential magnitude and means for applying said control potential signal to said control electrode of said controllable unidirectional current translating device.

9. A potential regulating circuit for regulating the rectified output potential of a three phase permanent magnet type alternator comprising a bridge type rectifier circuit including at least three unidirectional current translating devices and three controllable unidirectional current translating devices each having two current carrying electrodes and a control electrode and being of the type which may be triggered to conduction upon the application of a control potential signal of proper polarity to the control electrode thereof for rectifying the output potential generated in the output windings of said alternator, a control potential signal circuit comprising the series combination of a resistor, a diode and a capacitor connected across two output windings of said permanent magnet type alternator for producing said control potential signal, means for establishing said control potential signal at a magnitude substantially equal to the desired regulated potential magnitude, means for attenuating high potential surges appearing in said control potential signal circuit and means for applying said control potential signal to said control electrodes of said controllable unidirectional current translating devices.

10. A potential regulating circuit for regulating the rectified output potential of a three phase permanent magnet type alternator comprising a bridge type rectifier circuit including at least three unidirectional current translating devices and three silicon controlled rectifier devices each having an anode, a cathode and a control electrode for rectifying the output potential generated in the output windings of said alternator, a control potential signal circuit comprising the series combination of a resistor, a diode and a capacitor connected across two output windings of said permanent magnet type alternator for producing said control potential signal, means for establishing said control potential signal at a magnitude substantially equal to the desired regulated potential magnitude, means for attenuating high potential surges appearing in said control potential signal circuit and means for applying said control potential signal to said control electrodes of said silicon controlled rectifiers.

References Cited

UNITED STATES PATENTS

| 3,061,768 | 10/1962 | DeRuiter | 321—16 |
| 3,230,442 | 1/1966 | Korda | 322—28 |
| 3,315,141 | 4/1967 | Wright et al. | 320—61 X |

MILTON O. HIRSHFIELD, *Primary Examiner.*

J. D. TRAMMELL, *Assistant Examiner.*